(12) United States Patent
Kim et al.

(10) Patent No.: US 11,527,333 B2
(45) Date of Patent: Dec. 13, 2022

(54) FULLY CERAMIC MICROENCAPSULATED FUELS CONTAINING TRISTRUCTURAL-ISOTROPIC PARTICLES WITH A COATING LAYER HAVING HIGHER SHRINKAGE THAN MATRIX

(71) Applicants: UNIVERSITY OF SEOUL INDUSTRY COOPERATION FOUNDATION, Seoul (KR); KEPCO NUCLEAR FUEL CO., LTD., Daejeon (KR)

(72) Inventors: Young Wook Kim, Seoul (KR); Jung Hye Eom, Seoul (KR); Yu Kwang Seo, Gimpo-si (KR); Seung Jae Lee, Daejeon (KR)

(73) Assignees: UNIVERSITY OF SEOUL INDUSTRY COOPERATION FOUNDATION, Seoul (KR); KEPCO NUCLEAR FUEL CO., LTD., Daejeon (KR)

( * ) Notice: Subject to any disclaimer, the term of this patent is extended or adjusted under 35 U.S.C. 154(b) by 52 days.

(21) Appl. No.: 17/216,676

(22) Filed: Mar. 30, 2021

(65) Prior Publication Data
US 2021/0304907 A1 Sep. 30, 2021

Related U.S. Application Data (62) Division of application No. 15/751,164, filed as application No. PCT/KR2016/007848 on Jul. 19, 2016, now Pat. No. 11,004,570.

(30) Foreign Application Priority Data

Aug. 7, 2015 (KR) .................. 10-2015-0111888

(51) Int. Cl.
*G21C 3/62* (2006.01)
*C04B 35/626* (2006.01)
(Continued)

(52) U.S. Cl.
CPC ............ *G21C 3/626* (2013.01); *C04B 35/565* (2013.01); *C04B 35/6261* (2013.01);
(Continued)

(58) Field of Classification Search
None
See application file for complete search history.

(56) References Cited

U.S. PATENT DOCUMENTS 3,166,614 A * 1/1965 Taylor ................. G21C 3/06
264/0.5
3,463,702 A * 8/1969 D Eye ................. G21C 3/044
376/426

(Continued)

FOREIGN PATENT DOCUMENTS

GB     1173897 A * 12/1969 ......... C04B 41/5053
GB     1173897 A     12/1969
(Continued)

OTHER PUBLICATIONS

International Search Report in International Application No. PCT/KR2016/007848, dated Oct. 21, 2016.

*Primary Examiner* — Lily C Garner
(74) *Attorney, Agent, or Firm* — Park, Kim & Suh, LLC (57) ABSTRACT

The present invention relates to a method for preparing a fully ceramic capsulated nuclear fuel material containing three-layer-structured isotropic nuclear fuel particles coated with a ceramic having a composition which has a higher shrinkage than a matrix in order to prevent cracking of ceramic nuclear fuel, wherein the three-layer-structured nuclear fuel particles before coating is included in the range (Continued)

of between 5 and 40 fractions by volume based on after sintering. More specifically, the present invention provides a composition for preparing a fully ceramic capsulated nuclear fuel containing three-layer-structured isotropic particles coated with the substance which includes, as a main ingredient, a silicon carbine derived from a precursor of the silicon carbide wherein a condition of $\Delta L_c > \Delta L_m$ at normal pressure sintering is created, where the sintering shrinkage of the coating layer of the three-layer-structured isotropic nuclear fuel particles is $\Delta L_c$ and the sintering shrinkage of the silicon carbide matrix is $\Delta L_m$; material produced therefrom; and a method for manufacturing the material. The residual porosity of the fully ceramic capsulated nuclear fuel material is 4% or less.

2 Claims, 2 Drawing Sheets

(51) Int. Cl.
  *C04B 35/628* (2006.01)
  *C04B 35/634* (2006.01)
  *C04B 35/565* (2006.01)
  *C04B 35/632* (2006.01)
  *C04B 35/645* (2006.01)
  *C04B 38/00* (2006.01)
  *G21C 3/20* (2006.01)
  *G21C 21/04* (2006.01)

(52) U.S. Cl.
  CPC .. *C04B 35/62655* (2013.01); *C04B 35/62886* (2013.01); *C04B 35/62894* (2013.01); *C04B 35/632* (2013.01); *C04B 35/63472* (2013.01); *C04B 35/645* (2013.01); *C04B 38/0022* (2013.01); *G21C 3/20* (2013.01); *G21C 3/62* (2013.01); *G21C 21/04* (2013.01); *C04B 35/62834* (2013.01); *C04B 2235/3208* (2013.01); *C04B 2235/3217* (2013.01); *C04B 2235/3225* (2013.01); *C04B 2235/383* (2013.01); *C04B 2235/3826* (2013.01); *C04B 2235/3834* (2013.01); *C04B 2235/48* (2013.01); *C04B 2235/483* (2013.01); *C04B 2235/5436* (2013.01); *C04B 2235/5445* (2013.01); *C04B 2235/604* (2013.01); *C04B 2235/658* (2013.01); *C04B 2235/6562* (2013.01); *C04B 2235/6567* (2013.01); *C04B 2235/668* (2013.01); *C04B 2235/77* (2013.01); *Y02E 30/30* (2013.01)

(56) References Cited

U.S. PATENT DOCUMENTS

| | | | | |
|---|---|---|---|---|
| 3,878,041 | A * | 4/1975 | Leitnaker | G21C 3/62 376/411 |
| 4,010,287 | A * | 3/1977 | Beatty | C04B 35/51 427/6 |
| 4,076,775 | A * | 2/1978 | Hackstein | G21C 3/64 264/0.5 |
| 4,227,081 | A * | 10/1980 | Caputo | G21C 17/07 250/302 |
| 5,805,657 | A * | 9/1998 | Heubeck | G21C 3/042 376/457 |
| 6,190,725 | B1 * | 2/2001 | Lee | G21C 3/20 427/6 |
| 9,299,464 | B2 * | 3/2016 | Venneri | G21C 3/20 |
| 2004/0113332 | A1 | 6/2004 | Kohyama et al. | |
| 2009/0032178 | A1 * | 2/2009 | Feinroth | C04B 35/565 156/143 |
| 2012/0140867 | A1 * | 6/2012 | Venneri | G21C 3/626 376/414 |
| 2013/0077731 | A1 * | 3/2013 | Sherwood | G21C 3/62 376/417 |
| 2014/0192949 | A1 * | 7/2014 | Feinroth | G21C 3/10 376/451 |
| 2015/0228363 | A1 * | 8/2015 | Dewan | G21C 3/06 376/458 |
| 2017/0025192 | A1 | 1/2017 | Snead et al. | |

FOREIGN PATENT DOCUMENTS

| | | | | |
|---|---|---|---|---|
| GB | 2115212 A | * | 9/1983 | G21C 3/20 |
| JP | 2005-104736 A | | 4/2005 | |
| KR | 10-2011-0029026 A | | 3/2011 | |
| KR | 10-1040761 B1 | | 6/2011 | |
| KR | 10-2013-0079565 A | | 7/2013 | |
| KR | 10-2013-0140752 A | | 12/2013 | |
| KR | 10-1383654 B1 | | 4/2014 | |
| KR | 10-2014-0091410 A | | 7/2014 | |
| KR | 10-2015-0006161 A | | 1/2015 | |
| KR | 10-1578439 B1 | | 12/2015 | |
| WO | WO-2005086173 A2 | * | 9/2005 | G21C 3/17 |

* cited by examiner

FULLY CERAMIC MICROENCAPSULATED FUELS CONTAINING TRISTRUCTURAL-ISOTROPIC PARTICLES WITH A COATING LAYER HAVING HIGHER SHRINKAGE THAN MATRIX

This application is a division of U.S. patent application Ser. No. 15/751,164, filed on Feb. 7, 2018, which is the national stage filing under 35 U.S.C. 371 of International Application No. PCT/KR2016/007848, filed on Jul. 19, 2016, which claims the benefit of Korean Patent Application No. 10-2015-0111888, filed on Aug. 7, 2015, the contents of which are all hereby incorporated by reference herein in their entirety.

TECHNICAL FIELD

The present invention relates to a ceramic capsulated nuclear fuel including three-layer-structured isotropic nuclear fuel particles being coated with a ceramic composition having a higher shrinkage than a matrix in order to prevent cracks from occurring in a fully ceramic capsulated nuclear fuel material, and a method for preparing the same and, more particularly, to a fully ceramic capsulated nuclear fuel material, a composition thereof, and a method for preparing the same, wherein three-layer-structured isotropic nuclear fuel particles are coated with a composition for ceramic coating layers including a silicon carbide precursor causing excessive shrinkage, silicon carbide being used as a filler, and sintering additives, and wherein the three-layer-structured isotropic nuclear fuel particles are included in within a range of 5~40% of the total composition based on a volume ratio.

The ceramic capsulated nuclear fuel of the present invention includes multiple ceramic-coated three-layer-structured isotropic nuclear fuel particles and may, therefore, be highly effectively used in the same field of technology as a ceramic-capsulated nuclear fuel with an outstandingly enhanced accident tolerance.

BACKGROUND ART

For the past decades, nuclear energy (or power) has been used as a reliable power source. However, due to issues of storage and treatment of nuclear waste (or radioactive waste), the unique danger and risks related to cost, and stability and safety of nuclear fuels since the Fukushima Daiichi nuclear disaster of March, 2011, the usage of nuclear power has become a critical controversial issue. Most of the nuclear fuels being used today correspond to a uranium dioxide ($UO_2$) sintered body, which is fabricated by a sintering process performed at a temperature range of 1700~1800° C., being stored in an airtight cladding tube made of a zirconium alloy.

While using the nuclear fuel, nuclear fission-product gas is generated, and, due to this gas, the pressure inside nuclear fuel rods increases, thereby causing an increase in instability. Additionally, since the nuclear fuel may be easily expanded (or swollen), if an accident occurs, such as a shortage of cooling water, this may result in damage in the nuclear fuel sintered body lattice. In the above-described form of nuclear fuel, a zirconium alloy fuel rod acts as a barrier that prevents the by-products of nuclear fission from flowing into the cooling water.

While using the nuclear fuel, when a critical accident occurs, such as a shortage of cooling water supply, evaporation of cooling and overheating of alloy fuel rods may occur, and, at a high temperature, the zirconium alloy fuel rod may react with vapor (or steam), which results in the generation of zirconium oxide and an excessive amount of oxygen. And, such excessive amount of oxygen is dangerous in that it may cause an explosion in the nuclear reactor. If the temperature rises to an even higher level, a melt-down may occur in the cladding tubes, thereby causing a critical catastrophe, such as leakage of radiation.

In order to increase accident tolerance in nuclear fuels, the Korean Patent Application No. 10-1383654 discloses a plate-type nuclear fuel sintered body and a preparation method of the same. More specifically, a hole is formed at the center of the plate-type nuclear fuel sintered body. This is advantageous in controlling deformation in the zirconium cladding, when nuclear fission gas vapor is generated, thereby extending the duration of the plate-type nuclear fuel and increasing the degree of burn-up. Additionally, the plate-type nuclear fuel also has the advantageous effect of enhancing stability by forming a thermal conduction path at the center of the plate-type nuclear fuel so as to reduce internal temperature and to decrease the discharged amount of nuclear fission gas.

However, the plate-type nuclear fuel also uses zirconium alloy cladding tubes. And, accordingly, if a critical accident occurs, such as a shortage of cooling water supply, the plate-type nuclear fuel is also as dangerous as the conventional nuclear fuel, in that the same kind of catastrophe may occur.

Additionally, as another prior art, the Korean Patent Application Publication No. 10-2013-0079565 discloses ceramic-ceramic composites and a method for preparing the same in order to enhance thermal conductivity of nuclear fuel is disclosed. In this invention, the method for preparing ceramic-ceramic composites proposes a preparation method, wherein, after preparing spherical particle powder of uranium dioxide ($UO_2$), beryllium oxide (BeO) having a high thermal conductivity is co-milled and coated on the spherical particles, and, then, sintering is performed at a temperature range of 1400~1700° C. However, according to this invention, when a uranium dioxide ($UO_2$) and beryllium oxide sintered body is sintered, due to the difference in shrinkage between the two materials, cracks and pore may be developed in the final fuel product.

Meanwhile, even in case of using the nuclear fuel that is coated with a material having high thermal conductivity, since zirconium alloy cladding tubes are used, if a critical accident occurs, such as a shortage of cooling water supply, the plate-type nuclear fuel is also as dangerous as the conventional nuclear fuel, in that the same kind of catastrophe may occur.

In order to enhance the essential resistance to the above-described accidents of nuclear fuel, the Korean Patent Application Publication No. 10-2013-0140752 provides a nuclear fuel including fuel elements configured of a plurality of tristructural (or three-layer-structured) isotropic nuclear fuel particles (being configured of uranium oxide or uranium nitride kernel (central part)+porous carbon buffer layer+ internal pyrolitic carbon layer+silicon carbide layer+external pyrolitic carbon layer) that are inserted in a silicon carbide matrix. The above-described nuclear fuel has the advantages of providing normal operation of a nuclear reactor and an additional barrier against accident-causing temperature and nuclear fission by-products that may be leaked during contamination of the cooling water within the nuclear reactor, and facilitating storage of the nuclear fission by-products after its treatment. This patent publication proposes a method of mixing a plurality of tristructural (or three-layer-structured) isotropic nuclear fuel particles with silicon carbide power, and performing hot-press sintering at a pressure of approximately 1850° C., after including at least one of alumina ($Al_2O_3$) and rare earth oxides as sintering additives, as the method for preparing a silicon carbide matrix.

However, the above-described technique is disadvantageous in that a considerable amount of fabrication cost is required due to the usage of the hot-press sintering method when preparing the sintered body, and that, when performing hot-press sintering, since only a small number of nuclear fuels may be used to charge a graphite mold, it is difficult to apply this method to a process of mass production. Additionally, the above-described technique is also disadvantageous in that excessive sintering of uranium dioxide, which corresponds to the core of the tristructural isotropic nuclear fuel particle, is inevitable due to the extremely high temperature of the hot-process sintering process of approximately 1850° C., and that, due to the high sintering temperature, the process itself is not economically advantageous.

Meanwhile, in order to compensate for the by-product gas being generated during nuclear fission and the expansion (or swelling) of the nuclear fuel, uranium dioxide or uranium nitride, which corresponds to the core of the tristructural (or three-layer-structured) isotropic nuclear fuel particle, should generally be sintered while leaving approximately 5% of the pores. However, if the sintering temperature of the silicon carbide matrix including the tristructural isotropic nuclear fuel is greater (or higher) than 1800° C., additional sintering may be performed on the uranium dioxide or uranium nitride nuclear fuel, which has already been sintered, thereby causing degradation in porosity. Furthermore, there also lies a problem in that, due to the by-product gas being generated during nuclear fission and the expansion (or swelling) of the nuclear fuel, the pressure inside the silicon carbide matrix increases, thereby increasing the risk of the silicon carbide matrix being damaged during its usage.

Therefore, as a nuclear fuel having enhanced resistance (or tolerance) to accidents in nuclear power plants, it is most preferable that an ideal silicon carbide material being used for the preparation of a nuclear fuel having multiple tristructural (or three-layer-structured) isotropic nuclear fuel particles embedded in its silicon carbide matrix (1) has high thermal conductivity in order to be capable of effectively delivering the heat, which is discharged due to nuclear fission, to the cooling water, (2) since a tristructural isotropic nuclear fuel particle contains uranium dioxide ($UO_2$) or uranium nitride, which has been prepared at a temperature near a temperature range of 1700~1800° C., in order to prevent the tristructural isotropic nuclear fuel from being damaged during its usage, it is most preferable that the silicon carbide material enveloping (or embedding) the tristructural isotropic nuclear fuel is sintered at 1800° C. or below, and (3) in order to eliminate any risk of having the tristructural isotropic nuclear fuel particles be damaged or deformed due to the pressure applied during the sintering process, it is most preferable to use a normal pressure sintering (or pressureless sintering) process, wherein pressure is not applied.

Figure 1:
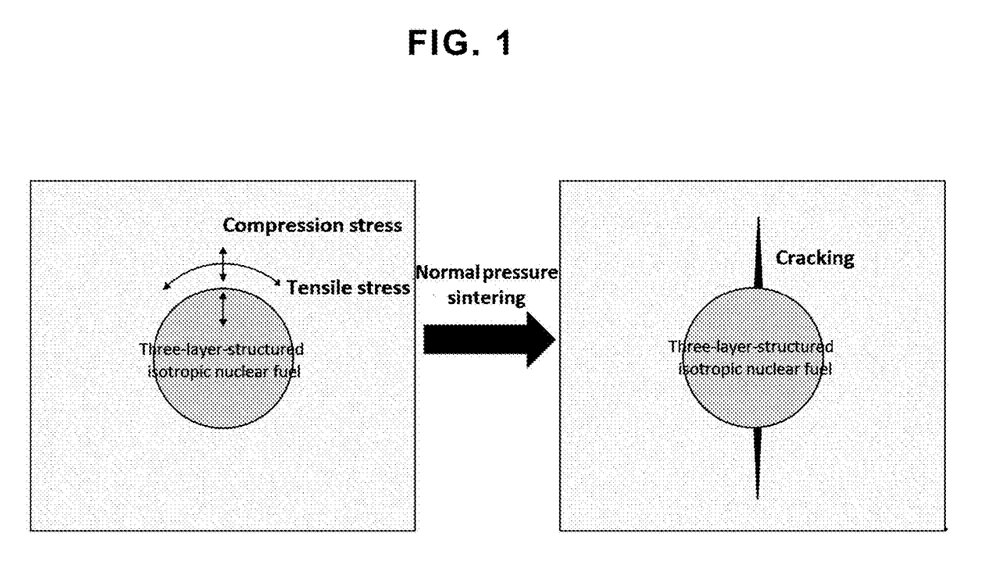
FIG. 1 illustrates a mimetic diagram describing the principles of cracks occurring in silicon carbide matrices.
Figure 2:
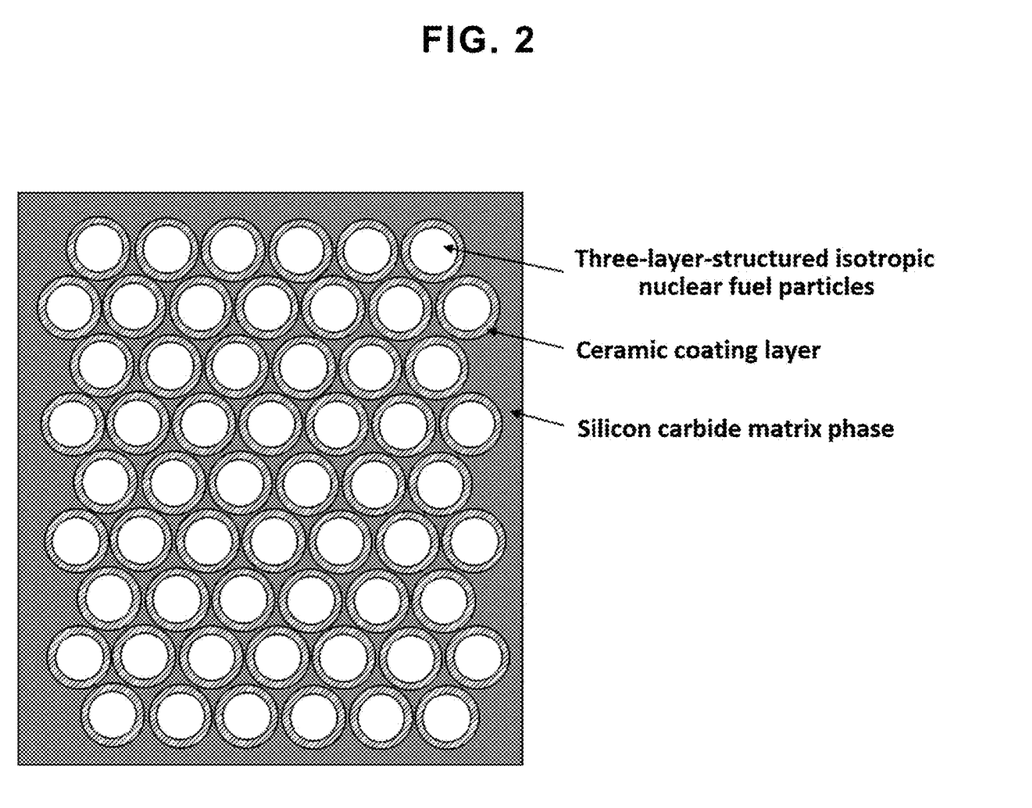
FIG. 2 illustrates a conceptual diagram showing a ceramic capsulated nuclear material containing three-layer-structured (or triple-layered or tristructural) isotropic nuclear fuel particles being coated with ceramic including a silicon carbide precursor according to the present invention.

However, apart from the above-mentioned conditions, as a technical problem that should be overcome, as compared to the tristructural isotropic nuclear fuel particles that does not shrink during the sintering of a silicon carbide matrix phase, the silicon carbide matrix phase shrinks during the densification process when performing sintering. Thus, as shown in FIG. 1, compressive stress is generated along a central direction of the tristructural isotropic nuclear fuel, and tensile stress is generated along its tangential direction. And, accordingly, a problem lies in that if the tensile stress becomes greater than the strength of the silicon carbide material, a crack may occur.

In the prior art, a technique that can resolve the above-described problem of cracking has not yet been reported, and there lies a problem in that it is very difficult to prepare (or fabricate) a silicon carbide capsulated nuclear fuel material, which is prepared by using the normal pressure sintering process, and which include a plurality of tristructural (or three-layer-structured) isotropic nuclear fuel particles having no cracks (or ruptures) near the tristructural isotropic nuclear fuel.

DISCLOSURE

Technical Problem

The present invention has been devised to resolve the above-described technical problems, and to enhance stability against any accidents related to nuclear fuels. And, therefore, an object of the present invention is to provide a fully ceramic capsulated nuclear fuel material and a method for preparing the same including a plurality of three-layer-structured isotropic nuclear fuel particles being coated with ceramic in order to prevent cracks and pores from occurring during a sintering process.

Also, another object of the present invention is to provide a fully ceramic capsulated nuclear fuel material and a method for preparing the same having a very economic fabrication process, since its processing temperature is low and pressure is not required to be applied during the sintering process, by using a composition enabling the preparation of a dense silicon carbide sintered body to be possible by performing a normal pressure sintering (or pressureless sintering) process at a temperature of 1800° C. or below.

Also, yet another object of the present invention is to provide a fully ceramic capsulated nuclear fuel material and a method for preparing the same that is devised to be suitable for mass production, since a normal pressure sintering (or pressureless sintering) process is used herein.

Also, a further object of the present invention is to provide a fully ceramic capsulated nuclear fuel material and a method for preparing the same that can enhance thermal conductivity by minimizing phonon scattering inside the matrix, since positive ions within the sintering additives are hardly employed due to the low sintering temperature, thereby outstandingly enhancing its accident tolerance (or resistance against accidents).

Technical Solution

In order to achieve the above-described object of the present invention, provided herein is a fully ceramic capsulated nuclear fuel composition including three-layer-structured isotropic nuclear fuel particles with a coating layer having a shrinkage higher than a matrix phase including three-layer-structured isotropic nuclear fuel particles, a coating layer cladding the nuclear fuel particles, and a matrix phase enveloping the three-layer-structured isotropic nuclear fuel particles having the coating layer, wherein the coating layer is configured to include a silicon carbide precursor, silicon carbide, and sintering additives, wherein the matrix phase is configured to include silicon carbide and sintering additives, and wherein, when shrinkage of the coating layer of the three-layer-structured isotropic nuclear fuel particles during a sintering process is given as $\Delta L_C$, and when the shrinkage of the silicon carbide matrix phase during the sintering process is given as $\Delta L_m$, a condition of $\Delta L_C > \Delta L_m$ may be satisfied when performing normal pressure sintering.

Preferably, the three-layer-structured isotropic nuclear fuel particles may correspond to 5~40 volume % based on the total volume of the composition.

Preferably, the coating layer and the silicon carbide matrix phase may be prepared by a normal pressure sintering process.

Preferably, when a total composition is given as 100 parts by weight, the coating layer may include a silicon carbide precursor corresponding to 50.0~90.0 parts by weight, silicon carbide used as a filler corresponding to 5.0~30.0 parts by weight, and a sintering additive corresponding to 5.0~20.0 parts by weight.

Preferably, the sintering additive may correspond to a structural material including $Al_2O_3$ and $Y_2O_3$, further including at least two or more materials selected from CaO and materials being produced by heat treatment of CaO, and including two different positive ions.

Preferably, the silicon carbide precursor may be selected from at least one of polycarbosilane, a mixture of polysiloxane and phenolic resin, or a mixture of polysiloxane and xylene resin, and, wherein, in case of using the mixture of polysiloxane and phenolic resin or the mixture of polysiloxane and xylene resin, a mole ratio of Si:C in thermal decomposition remnants is within a range of 1:1~1:1.1.

Preferably, when a total composition is given as 100 parts by weight, the composition may include the silicon carbide matrix phase silicon carbide particles corresponding to 85.0~96.0 parts by weight and a sintering additive corresponding to 4.0~15.0 parts by weight.

Preferably, the sintering additive may correspond to a structural material including $Al_2O_3$ and $Y_2O_3$, further including at least two or more materials selected from CaO and materials being produced by heat treatment of CaO, and including two different positive ions.

Preferably, silicon carbide may have a particle size within a range of 0.1~1 μm.

Additionally, the present invention provides a fully ceramic capsulated nuclear fuel material including three-layer-structured isotropic nuclear fuel particles with a coating layer having a shrinkage higher than a matrix phase including three-layer-structured isotropic nuclear fuel particles having a coating layer, wherein the coating layer corresponds to a layer being formed by sintering a silicon carbide precursor, silicon carbide, and a sintering additive, and a silicon carbide matrix phase enveloping the three-layer-structured isotropic nuclear fuel particles, wherein, when shrinkage of the coating layer of the three-layer-structured isotropic nuclear fuel particles during a sintering process is given as $\Delta L_C$, and when the shrinkage of the silicon carbide matrix phase during the sintering process is given as $\Delta L_m$, a condition of $\Delta L_C > \Delta L_m$ may be satisfied when performing normal pressure sintering.

Preferably, the sintering may be performed by a normal pressure sintering process, the coating layer may have a remaining porosity of more than 0% and less than or equal to 4% after performing the normal pressure sintering process, and the three-layer-structured isotropic nuclear fuel particles may correspond to 5~40 volume % based on the total volume of the material.

Additionally, the present invention provides a method for preparing a fully ceramic capsulated nuclear fuel material including three-layer-structured isotropic nuclear fuel particles with a coating layer having a shrinkage higher than a matrix phase including the steps of (i) preparing a first mixture of a coating layer composition including a silicon carbide precursor; (ii) coating the three-layer-structured isotropic nuclear fuel particles by using the first mixture; (iii) preparing a second mixture of a silicon carbide matrix phase; (iv) preparing a third mixture by mixing the three-layer-structured isotropic nuclear fuel particles having a coating layer including the silicon carbide precursor with the second mixture of the silicon carbide matrix phase; (v) preparing a shaped body by using the third mixture; (vi) preparing a pre-sintered body by performing thermal decomposition of the silicon carbide precursor within the shaped body; and (vii) performing normal pressure sintering of the pre-sintered body processed with thermal decomposition, wherein, when shrinkage of the coating layer of the three-layer-structured isotropic nuclear fuel particles during a sintering process is given as $\Delta L_C$, and when the shrinkage of the silicon carbide matrix phase during the sintering process is given as $\Delta L_m$, a condition of $\Delta L_C > \Delta L_m$ may be satisfied when performing normal pressure sintering.

Preferably, a sintering temperature range during the normal pressure sintering may be 1700~1800° C.

Preferably, a holding time at a maximum temperature during the normal pressure sintering process may correspond to 0.5~4 hours, and wherein the sintering atmosphere corresponds to argon.

Preferably, in the step of preparing a partially sintered material, the preparation may be carried out at a heating speed within a range of 0.1° C./min~1° C./min in order to control cracking in the shaped body caused by a discharge of gas, the discharged gas being a by-product of the thermal decompression of the silicon carbide precursor.

Preferably, in the step of preparing a partially sintered material, the atmosphere may consist of ambient air starting from ambient temperature to 200° C. for cross-linking of the silicon carbide precursor, and the atmosphere may consist of argon gas starting from 200° C. to a temperature range of 800~1400° C. in order to prevent oxidation of silicon carbide.

Advantageous Effects

According to the present invention, by preventing cracks and pores from being generated, which are caused by the shrinking of a silicon carbide matrix near three-layer-structured isotropic nuclear fuel particles, a fully ceramic capsulated nuclear fuel may be prepared.

Additionally, by using silicon carbide in the matrix phase, thermal conductivity of the nuclear fuel may be increased, thereby decreasing the temperature of the fuel and reducing thermal stress, which caused by the cracking and swelling of the fuel. And, silicon carbide capsules enable normal operation of the nuclear reactors and provide an additional barrier against nuclear fission by-products that may be leaked at accident-causing temperatures and shortage of cooling water in the nuclear reactors. Accordingly, the accident tolerance may be outstandingly enhanced.

Additionally, after using the nuclear fuels, the storage of nuclear fission by-products may be facilitated.

Furthermore, according to the present invention, since the ceramic capsulated nuclear fuel material is prepared by a simple normal pressure sintering (or pressureless sintering) process, which has a low sintering temperature within a range of 1700~1800° C. and does not require any pressure applying process, the present invention may be applied in mass production and achieve fair competition.

BEST MODE FOR CARRYING OUT THE INVENTION

The present invention will hereinafter be described in more detail based on the preferred embodiments of the present invention and the accompanying drawings.

The operational principles of the present invention are as described below.

A coating layer of three-layer-structured (or tristructural) isotropic nuclear fuel particles is configured of a silicon carbide precursor, silicon carbide, and sintering additives, and a silicon carbide matrix phase is configured only of silicon carbide and sintering additives.

Generally, when three-layer-structured isotropic nuclear fuel particles that do not include (or contain) a shrinking coating layer are put in a silicon carbide matrix phase and sintered, given that the shrinkage of a three-layer-structured isotropic nuclear fuel is $\Delta L_P$ and that the shrinkage of a matrix phase is $\Delta L_m$, since $\Delta L_P=0$ (i.e., since shrinkage does not occur), this leads to a situation of $\Delta L_m \gg \Delta L_P$. Thus, multiple cracks occur in the silicon carbide matrix phase as shown in FIG. 1.

During the sintering process, the coating layer, which is configured of a silicon carbide precursor, silicon carbide, and sintering additives, the silicon carbide precursor of the coating layer is shifted to silicon carbide, and, simultaneously, as the coating layer undergoes densification, a considerable level of sintering shrinkage occurs. At this point, the sintering shrinkage of the coating layer is given as $\Delta L_C$. Meanwhile, as the silicon carbide matrix phase, which is configured of silicon carbide and sintering additives, also undergoes densification during the sintering process, sintering shrinkage also occurs. When nuclear particles, which are configured of a silicon carbide matrix phase containing three-layer-structured isotropic nuclear fuel particles having a containing layer, are processed with normal pressure sintering (or pressureless sintering), a condition of $\Delta L_C > \Delta L_m$ is created, thereby controlling (or suppressing) the occurrence of cracks (or ruptures), as shown in FIG. 1. Thus, silicon carbide capsulated nuclear fuel particles containing a plurality of three-layer-structured isotropic nuclear fuel particles being configured of a dense silicon carbide matrix phase having no rupture (or crack) may be fabricated.

In the present invention, a silicon carbide precursor is used as one of the main ingredients of a coating layer composition. Herein, the silicon carbide precursor is configured and used by selecting and mixing one or more elements from a group, which consists of polycarbosilane, a polysiloxane and phenolic resin mixture, a polysiloxane and xylene resin mixture, and a combination of the same. In case of using the polysiloxane and phenolic resin mixture or the polysiloxane and xylene resin mixture, it is preferable to use a composition having a Si:C molar ratio (or mole ratio) within a range of 1:1 to 1:1.1 in a remnant of thermal decomposition.

In case of using the polysiloxane and phenolic resin mixture or the polysiloxane and xylene resin mixture, if the Si:C molar ratio (or mole ratio) exceeds the range of 1:1 to 1:1.1 in the remnant of thermal decomposition, an excessive amount of $SiO_2$ may be formed, or an excessive amount of free carbon may be formed. Thus, the densification process of the matrix phase is obstructed (or disturbed), which results in a disadvantage of having a porosity exceeding 4%.

When using silicon carbide as a filler, silicon carbide powder having an average particle size of submicron unit is used. And, by adding sintering additives herein, a composition of a coating layer containing a silicon carbide precursor for coating the three-layer-structured isotropic nuclear fuel particles is prepared (or fabricated). Herein, it is preferable that the sintering additive corresponds to a composition including $Al_2O_3$ and $Y_2O_3$, and further including CaO and at least two substances producing CaO by performing thermal treatment, and including positive ions each being different from one another.

Herein, in order to prevent ruptures (or cracks) from occurring or pores (or pores) from being generated due to a difference in shrinkage between the three-layer-structured isotropic nuclear fuel particles and the silicon carbide matrix phase, the silicon carbide precursor is used in the coating layer. Accordingly, shrinking occurs excessively in the silicon carbide precursor during the thermal decomposition (or pyrolysis), thereby resulting in a (sintering shrinkage of the coating layer) $\Delta L_C >$ (sintering shrinkage of the silicon carbide matrix phase) $\Delta L_m$ situation during the sintering process. Thus, a ceramic capsulated nuclear fuel material having no cracks occurring on its silicon carbide matrix phase may be implemented.

The sintering additive of the present invention react with silicon dioxide ($SiO_2$) formed on the surface of silicon carbide, which is the main substance, at the sintering temperature and forms a quaternary eutectic liquid or a multi-component eutectic liquid (consisting of more than 4 components), due to the dissolution of silicon carbide. And, accordingly, sintering may be sufficiently performed without applying pressure even at a temperature range of 1700~1800° C., which is a very low temperature range for the sintering of silicon carbide.

Therefore, the ceramic capsulated nuclear fuel material including a plurality of ceramic-coated three-layer-structured isotropic nuclear fuel particles in order to prevent cracks from occurring during a sintering process of the present invention is advantageous in that a nuclear fuel with enhanced accident tolerance may be prepared, since the remaining porosity in the matrix phase is within the range of 0.01~3.0%, and since cracking that is caused by the difference in shrinkage between the three-layer-structured isotropic nuclear fuel particles and the silicon carbide matrix.

As described above, as a prior art technique, a nuclear fuel including fuel elements configured of a plurality of three-layer-structured isotropic nuclear fuel particles that are inserted in a silicon carbide matrix has been reported (Korean Patent Application Publication No. 10-2013-0140752). However, this technique is disadvantageous in that the material is prepared by using a hot-press sintering method, which is a highly expensive procedure, and that the process requires a high sintering temperature of 1850° C.

However, in a ceramic capsulated nuclear fuel material including three-layer-structured isotropic nuclear fuel particles being coated ceramic with a composition having a shrinkage higher than a matrix phase of the present invention, (1) a ceramic coating layer including a silicon carbide precursor may envelop the three-layer-structured isotropic nuclear fuel particles, (2) since the sintering temperature has a low temperature range of 1700~1800° C., excessive sintering of the uranium oxide or uranium nitride nuclear fuel may be prevented, (3) sintering may be processed during a short sintering time period within a range of 0.5~4 hours, (4) since the material is prepared by using a normal pressure sintering method (or pressureless sintering method), which does not require any pressure applying device, the sintering equipment and process are simplified, and (5) the nuclear fuel material may be prepared by using submicron units of silicon carbide. Therefore, the present invention has the advantage of being very economic in that it does not use expensive silicon carbide nano-powder.

In the process for preparing a fully ceramic capsulated nuclear fuel material including a plurality of three-layer-structured isotropic nuclear fuel particles with a ceramic coating layer, the steps of:

(i) preparing a first mixture of a coating layer composition including a silicon carbide precursor;

(ii) coating the three-layer-structured isotropic nuclear fuel particles by using the first mixture;

(iii) preparing a second mixture of a silicon carbide matrix phase;

(iv) preparing a third mixture by mixing the three-layer-structured isotropic nuclear fuel particles having a coating layer including the silicon carbide precursor with the second mixture of the silicon carbide matrix phase;

(v) preparing a shaped body a by using the third mixture;

(vi) preparing a pre-sintered body by performing thermal decomposition of the silicon carbide precursor within the shaped body; and (vii) performing normal pressure sintering of the pre-sintered body processed with thermal decomposition, are included.

In the present invention, it is preferable that, when a total weight of the composition is given as 100 parts by weight, the composition of the ceramic coating layer includes a silicon carbide precursor corresponding to 50.0~90.0 parts by weight, silicon carbide used as a filler corresponding to 5.0~30.0 parts by weight, and a sintering additive corresponding to 5.0~20.0 parts by weight, wherein the sintering additive corresponds to a structural material including $Al_2O_3$ and $Y_2O_3$, further including at least two or more materials selected from CaO and materials being produced by heat treatment of CaO, and including two different positive ions.

Additionally, for the silicon carbide powder, both alpha-phase and beta-phase silicon carbide powder may be used. Although the particle size is not specifically limited as long as the average particle size is less than 1 μm, in light of the economic aspect, it is preferable to use powder having the size of submicron units (equal to or greater than 0.1 μm and less than 1 μm) rather than powder having the size of nano units.

In the present invention, when using a silicon carbide precursor in order to prevent cracking and pores from occurring, in case the content of the silicon carbide precursor is less than 50.0 parts by weight, this is not preferable, since the shrinkage of the entire coating layer that occurs due to the thermal decomposition of the precursor becomes smaller, the difference in shrinkage between the three-layer-structured isotropic nuclear fuel and the silicon carbide matrix phase cannot be sufficiently compensated. And, in case the content of the silicon carbide precursor exceeds 90.0 parts by weight, this is not preferable, since pores and cracking may occur on the surface of the ceramic nuclear fuel due to the gas that is generated from the silicon carbide precursor during the thermal decomposition and sintering processes. Therefore, it is preferable that the content of the silicon carbide precursor in the coating layer is limited to a range of 50.0~90.0 parts by weight.

Additionally, in the coating layer, which is used to prevent cracking from occurring due to the difference in shrinkage between the three-layer-structured isotropic nuclear fuel and the silicon carbide matrix phase, it is preferable that the silicon carbide power, which is added to facilitate the release of the gas that is discharged during the thermal decomposition of the silicon carbide precursor and to facilitate the densification of the coating layer, is added within a range of 5.0~30.0 parts by weight. In the above-described coating layer, in case 50.0 parts by weight or less of the silicon carbide powder are used, this is not preferable in that the gas being discharged during the thermal decomposition of the silicon carbide cannot be easily released, thereby causing the thermal decomposition gas to be trapped inside the coating layer or causing cracks to occur in the coating layer. On the other hand, in case an amount of silicon carbide powder exceeding 30.0 parts by weight is used, this is not preferable in that, since the shrinkage of the coating layer that can compensate for the cracking is too low, cracking may occur in the matrix phase near the three-layer-structured isotropic nuclear fuel particles, as shown in FIG. 1. Therefore, it is preferable that the content of the silicon carbide filler in the coating layer is limited to a range of 5.0~30.0 parts by weight.

Meanwhile, for the coating process, this is preferable that a range of 0.5~15 parts by weight of a dispersing agent and an organic additive are further added to 100 parts by weight of the coating layer composition, which is configured of the silicon carbide precursor, silicon carbide, and sintering additives. The organic additive may include a dispersing agent and a binder. And, although it is adequate to use sulphonic acid and polyoxyethylene actyphenol ether as the dispersing agent, the substance used herein will not be limited only to these. And, as the binder, at least one or more of organic binders may be used by being selected from polyvinyl alcohol, polyethylene glycol, and polyvinyl butyral. However, the substance used herein will not be limited only to these. More specifically, any dispersing agent and organic binder that facilitates the coating of the three-layer-structured isotropic nuclear fuel particles may be used.

A general mixing method is used as the method for mixing the composition of the coating layer, which corresponds to a general step of mixing the composition of the coating layer by using a ball mill, and, as long as a uniform coating layer composition can be prepared, any type of mixing method may be applied herein. For example, it is preferable to perform mixing according to the general ball-milling process by using a silicon carbide ball and a polyprophylene bottle. Additionally, for the solvent that is added during the ball-milling process in order to mix the raw materials listed above, when the weight of the coating layer composition is given as 100 parts by weight, it is preferable that the added amount of solvent corresponds to a range of 40~130 parts by weight. This value range has its significance only as a threshold value that has been set up in consideration of a homogeneous mixture and the economic aspect. Meanwhile, it is preferable that the general ball-milling process is carried out for a time period of approximately 4~48 hours. A mixture that is prepared from this process will be referred to as a first mixture.

For the solvent, any type of solvent that can dissolve the silicon carbide precursor may be used, and, therefore, the type of solvent will not be limited. And, more specifically, any one of methanol, ethanol, propanol, butanol, acetone, and so on, may be singularly used or a mixture of two or more of the listed solvents may be used.

In the step of forming a coating layer on the three-layer-structured isotropic nuclear fuel particles by using the first mixture of the coating layer, a general coating method may be used. For example, although diverse methods may be used herein, such as flow coating, dip coating, spray coating, a coating method using an oscillating granulator, or a combination of the above. However, the method will not be limited only to the coating methods that are listed above. And, therefore, any method that can perform coating of the three-layer-structured isotropic nuclear fuel particles by using a composition, which is configured of a silicon carbide precursor, silicon carbide, and a sintering additive, may be used herein.

Among the coating methods that are listed above, in order to obtain uniform coating, it is more preferable to use the coating method using an oscillating granulator, the dip coating method, or the spray coating method. Also, after performing the coating process, a drying process may be performed by using a blow-drying method using warm air, hot air, dehumidified air, vacuum drying, radiation drying using infrared rays or electron rays. However, it is more preferable that a blow-drying method using hot air within a range of 50~100° C. is used herein.

In the present invention, when a total weight of the composition of the silicon carbide matrix phase is given as 100 parts by weight, it is preferable that the composition of the silicon carbide matrix phase, which envelops the three-layer-structured isotropic nuclear fuel particles, includes silicon carbide particles corresponding to 85.0~96.0 parts by weight, and a sintering additive corresponding to 4.0~15.0 parts by weight, wherein the sintering additive corresponds to a structural material including $Al_2O_3$ and $Y_2O_3$, further including at least two or more materials selected from CaO and materials being produced by heat treatment of CaO, and including two different positive ions. If the content of the sintering additive is less than 4.0 parts by weight, the porosity exceeds 4%, and, therefore, this is not preferable. And, if the content of the sintering additive exceeds 15.0 parts by weight, since the shrinkage of the silicon carbide matrix phase becomes too high, the difference in shrinkage between the silicon carbide matrix phase and the coating layer of the three-layer-structured isotropic nuclear fuel particles becomes too low, which may lead to the situation shown in FIG. 1. Therefore, it is preferable that the content of the sintering additive in the composition of the silicon carbide matrix phase is limited to a range of 4.0~15.0 parts by weight. The mixture for preparing the silicon carbide matrix phase composition will be referred to as a second mixture.

Meanwhile, it is preferable to further add 0.5~7 parts of weight of organic additive to the 100 parts by weight of the silicon carbide matrix phase composition. The organic additive may include a binder, a plasticizer, and a lubricant, and, as the binder, at least one or more of organic binders may be used by being selected from polyvinyl alcohol, polyethylene glycol, and polyvinyl butyral. However, the substance used herein will not be limited only to these. Although polyethylene glycol, benzyl butyl phthalate, and so on, may be used as the plasticizer, the substance used herein will not be limited only to these. Furthermore, although oleic acid, stearic acid, and so on, may be used as the lubricant, the substance used herein will not be limited only to these. More specifically, any organic additive that can facilitate the formation (or molding) of the matrix phase composition including the three-layer-structured isotropic nuclear fuel particles having a shrinking coating layer may be used herein.

A general mixing method is used as the method for mixing the composition of the silicon carbide matrix phase. For example, it is preferable to perform mixing according to the general ball-milling process by using a silicon carbide ball and a polyprophylene bottle. Additionally, for the solvent that is added during the ball-milling process in order to mix the raw materials listed above, when the weight of the coating layer composition is given as 100 parts by weight, it is preferable that the added amount of solvent corresponds to a range of 40~130 parts by weight. This value range has its significance only as a threshold value that has been set up in consideration of a homogeneous mixture and the economic aspect. Meanwhile, it is preferable that the general ball-milling process is carried out for a time period of approximately 4~48 hours.

In order to control the oxidation of the silicon carbide particles, it is preferable to use an organic solvent rather than distilled water as the solvent that is used in the mixing process. Although the type of organic solvent is not specifically limited, any organic solvent that can dissolve the organic additive, which is additionally added apart from the silicon carbide and sintering additive, may be used. More specifically, any one of methanol, ethanol, propanol, butanol, acetone, and so on, may be singularly used or a mixture of two or more of the listed solvents may be used.

In the step of uniformly mixing the ceramic-coated three-layer-structured isotropic nuclear fuel particles with the silicon carbide matrix phase composition, the three-layer-structured isotropic nuclear fuel particles, which are coated with a composition including a silicon carbide precursor, are added to the silicon carbide matrix phase composition and mixed by using a dry mixing method. At this point, the mixing process may be carried out by a general ball-milling method, wherein a plastic ball and a plastic container (or bottle) is used, or the mixing process may also be carried out by simply using a plastic spoon. The mixing process may also be carried out by using an oscillating granulator. And, the mixture being prepared from the above-mentioned method will be referred to as a third mixture.

In the step of preparing a shaped body by using a third mixture, which correspond to a mixture of the coated three-layer-structured isotropic nuclear fuel particles and the silicon carbide matrix phase composition, it is preferable to perform cold isostatic pressing (or molding) by using a rubber mold. Herein, a predetermined amount of the mixture of the matrix phase may be filled in the rubber mold, and, then, isostatic pressing (or molding) may be performed.

Meanwhile, although it is preferable to perform cold isostatic pressing (or molding), it is not necessarily required to perform cold isostatic pressing (or molding) only. And, therefore, the shaped body may also be prepared by using a general uniaxial pressing method, or by using a uniaxial pressing method and a subsequent cold isostatic pressing method.

In the step of performing thermal decomposition on the shaped body, it is preferable to perform heat treatment for a time period within a range of 0.5~4 hours at a temperature range of 800~1400° C. in a general atmosphere. At this point, a heating speed may be set to a range of 0.1° C./min 1° C./min so that heating is carried out slowly, in order to control cracking in the shaped body caused by a discharge of gas, wherein the discharged gas is a by-product of the thermal decompression of the silicon carbide precursor. A cooling speed may be determined in accordance with furnace cooling.

In the step of performing thermal decomposition on the shaped body, for the cross-linking of the silicon carbide precursor, heating should be performed in ambient air starting from room temperature (or ambient temperature) to 200° C., and it is preferable to use argon gas starting from 200° C. to the maximum temperature in order to prevent oxidation of silicon carbide.

When performing the thermal decomposition process of the silicon carbide precursor, if the temperature is less than 800° C., since the thermal decomposition of the silicon carbide precursor is not sufficiently performed sufficiently, this is not preferable. And, if the temperature exceeds 1400° C., the sintering additive may react with the $SiO_2$ layer formed on the surface of the silicon carbide particles so as to form a liquid, which causes grain growth in the silicon carbide, thereby degrading the driving force of the sintering process (decreasing surface energy). Therefore, this is also not preferable. Accordingly, it is preferable to limit the temperature for the thermal decomposition of the silicon carbide precursor to a temperature range of 800~1400° C.

When performing the thermal decomposition process of the silicon carbide precursor, if the holding time is equal to 0.5 hour or less, since the thermal decomposition is not sufficiently performed, this is not preferable. And, if the holding time exceeds 2 hours, there is no additional thermal decomposition effect. Therefore, it is preferable to limit the holding time at the maximum temperature to a range of 0.5~2 hours.

In the step of sintering the thermally decomposed shaped body, it is preferable to perform sintering by using a general graphite moderated reactor for a time period within a range of 0.5~4 hours in an argon atmosphere at a temperature range of 1700~1800° C. If the sintering temperature is below 1700° C., the porosity exceeds 4%, and, therefore, this is not preferable. And, if the sintering temperature exceeds 1800° C., grain growth in the silicon carbide matrix phase and excessive sintering of uranium oxide or uranium nitride corresponding to the core of the three-layer-structured isotropic nuclear fuel occur without any additional increase in the sintering density. Accordingly, when using the nuclear fuel, since a problem occurs in that the by-product of nuclear fission cannot be accommodated, this is not preferable. Therefore, it is preferable to limit the sintering temperature to a temperature range of 1700~1800° C. If the sintering time is less than 0.5 hour, since the sintering is not sufficiently performed, the porosity exceeds 4%. And, therefore, this is not preferable. And, if the sintering time exceeds 4 hours, coarsening of the silicon carbide particles may occur without any additional densification, and degradation in density, which is caused by volatilization of liquid, may also occur. Therefore, this is not preferable. Accordingly, it is preferable to limit the sintering time to a time period within a range of 0.5~4 hours. However, the sintering temperature condition is more important than the above-described sintering time condition.

It is preferable to use argon as the sintering atmosphere, and it is not preferable to use oxygen or ambient air as the sintering atmosphere because oxygen or air causes oxidation of silicon carbide. Helium may also be used as the sintering atmosphere. However, when considering the economic aspect, argon is more adequate.

Hereinafter, the exemplary embodiments of the present invention will be described in detail. The proposed exemplary embodiments are merely exemplary and, therefore, will not limit the scope of the present invention.

Exemplary Embodiment 1-3, Exemplary Comparison 1-3

As described below, in the exemplary embodiment of the present invention, a ceramic capsulated nuclear fuel material including ceramic-coated three-layer-structured isotropic nuclear fuel particles for preventing cracking is prepared by performing steps 1-1 to 1-4.

1-1. Preparing a Ceramic Coating Layer Slurry Including a Silicon Carbide Precursor According to the ratio shown below in Table 1, polycarbosilane is used as the silicon carbide precursor. And, a coating composition for coating three-layer-structured isotropic nuclear fuel particles is prepared by mixing beta-phase silicon carbide powder having an average particle diameter of 0.5 μm within Alumina ($Al_2O_3$), Yttria ($Y_2O_3$), and Calcia (CaO) each having an average particle diameter of 3 μm. For the composition corresponding to 100 parts by weight, sulphonic acid corresponding to 0.4 parts by weight, polyoxyethylene actylphenol ether corresponding to 0.3 parts by weight, polyethylene glycol corresponding to 4 parts by weight and polyvinyl alcohol corresponding to 2 parts by weight are added as the organic additives, and ethanol corresponding to 75 parts by weight is additionally added as the solvent. And, a uniform mixture slurry is obtained by performing ball-milling for 24 hours by using a polyprophylene bottle and a silicon carbide ball.

1-2. Preparing Three-Layer-Structured Isotropic Nuclear Fuel Particles with a Ceramic Coating Layer Including a Silicon Carbide Precursor The three-layer-structured isotropic nuclear fuel particles are coated with the ceramic coating layer slurry including a silicon carbide precursor, which is prepared according to the above-described method of 1-1, by using the dip coating method. Then, a drying process is performed in a hot air oven for more than 24 hours at a temperature of 70° C., thereby preparing three-layer-structured isotropic nuclear fuel particles with a coating layer including silicon carbide precursor.

1-3. Preparing a Silicon Carbide Matrix Phase Composition

According to the ratio shown below in Table 2, a silicon carbide matrix phase composition is prepared by mixing beta-phase silicon carbide powder having an average particle diameter of 0.5 μm within Alumina ($Al_2O_3$), Yttria ($Y_2O_3$), and calcium carbonate ($CaCO_3$) each having an average particle diameter of 3 μm. For the composition corresponding to 100 parts by weight, polyethylene glycol corresponding to 1 part by weight and polyvinyl alcohol corresponding to 2 parts by weight are added as the organic additives, and ethanol corresponding to 75 parts by weight is additionally added as the solvent. And, a uniform mixture is obtained by performing ball-milling for 24 hours by using a polyprophylene bottle and a silicon carbide ball.

Thereafter, a uniform silicon carbide matrix phase mixture is prepared by drying the mixture in a general dryer.

1-4. Preparing a Ceramic-Coated Ceramic Nuclear Fuel Material

The ceramic three-layer-structured isotropic nuclear fuel particles being coated with a ceramic layer including a silicon carbide precursor, which is prepared according to the above-described method of 1-2, is added to the silicon carbide matrix phase mixture, which is prepared according to the above-described method of 1-3, so that the content of the nuclear fuel particles becomes equal to 27% of the total volume of the composition, and, then, the mixture is processed with dry blending in a polyprophylene ball mill. The mixture is then poured into a rubber mold and processed with cold isostatic pressing (or molding) at a pressure of 80 MPa, thereby obtaining a cylindrical shaped body having a diameter of 12 mm and a height of 12 mm.

Thereafter, the cylindrical shaped body is processed with thermal decomposition according to the thermal decomposition conditions indicated in Table 3 shown below. Afterwards, by performing normal pressure sintering on the thermally decomposed body according to the sintering conditions indicated in Table 3 in an argon atmosphere, the ceramic-coated ceramic nuclear fuel material is prepared. According to the thermal decomposition conditions, starting from room temperature (or ambient temperature) to 200° C., the thermal decomposition process is carried out by heating the shaped body in ambient air at the heating speed indicated in Table 3, and starting from 200° C. to 1400° C., the thermal decomposition process is carried out by heating the shaped body in an argon atmosphere at the heating speed indicated in Table 3.

In the comparative examples 1 and 2, as shown in Table 1, a mixture is prepared by using the same method as the exemplary embodiment while varying the content of the silicon carbide precursor of the ceramic coating layer, which corresponds to one of the key ideas of the present invention. And, the mixture is sintered in an argon atmosphere according to the heat treatment condition indicated in Table 3 shown below.

In the comparative example 3, as shown in Table 1, a mixture is prepared by using the same method as the exemplary embodiment without adding the silicon carbide precursor to the coating layer of the three-layer-structured isotropic nuclear fuel particles, which corresponds to one of the key ideas of the present invention. And, the mixture is sintered in an argon atmosphere according to the heat treatment condition indicated in Table 3 shown below. In the comparative example 3, since the silicon carbide precursor has not been added, the thermal decomposition process may not be required. However, in order to perform a comparison with another exemplary embodiment, the thermal decomposition process is carried out according to the conditions indicated in Table 3.

Table 1 shown below indicates the composition of the coating layer, Table 2 shown below indicates the composition of the silicon carbide matrix phase, and Table 3 shown below indicates the thermal decomposition condition, the normal pressure sintering condition, and the porosity of the fully ceramic capsulated nuclear fuel material.

TABLE 1

| Description (parts by weight) | | Silicon Carbide Precursor (Polyprophylene) | Beta-phase Silicon Carbide ($\beta$-SiC) | Alumina ($Al_2O_3$) | Yttria ($Y_2O_3$) | Calcia (CaO) | Normal Pressure Sintering Condition | |
|---|---|---|---|---|---|---|---|---|
| | | | | | | | Temp. (° C.) | Time (h) |
| Comparative Examples | 1 | 5.1 | 88.9 | 4.2 | 1.0 | 0.8 | 1725 | 2 |
| | 2 | 92.9 | 0.2 | 1.0 | 0.8 | 4.5 | 1700 | 2 |
| | 3 | 0 | 93.7 | 3.3 | 1.8 | 1.2 | 1770 | 1 |
| Exemplary Embodiment | 1 | 59.7 | 30.0 | 6.3 | 3.2 | 0.8 | 1750 | 2 |
| | 2 | 72.7 | 21.2 | 4.6 | 1.1 | 0.4 | 1725 | 4 |
| | 3 | 83.0 | 10.9 | 3.3 | 1.8 | 1.0 | 1770 | 1 |

TABLE 2

| Description (parts by weight) | | Beta-phase Silicon Carbide ($\beta$-SiC) | Alumina ($Al_2O_3$) | Yttria ($Y_2O_3$) | Calcium Carbonate ($CaCO_3$) |
|---|---|---|---|---|---|
| Comparative Examples | 1 | 89.5 | 4.7 | 4.8 | 1.0 |
| | 2 | 90.4 | 4.0 | 3.9 | 1.7 |
| | 3 | 92.9 | 2.6 | 3.7 | 0.8 |
| Exemplary Embodiment | 1 | 86.4 | 8.3 | 4.7 | 0.6 |
| | 2 | 87.2 | 7.5 | 3.7 | 1.6 |
| | 3 | 90.2 | 6.2 | 2.9 | 0.7 |

TABLE 3

| Description | | Thermal Decomposition Condition | | | Normal Pressure Sintering Condition | | Porosity (%) |
|---|---|---|---|---|---|---|---|
| | | Temp. (° C.) | Time (h) | Heating speed (° C./min) | Temp. (° C.) | Time (h) | |
| Comparative Examples | 1 | 1100 | 0.5 | 0.2 | 1725 | 2 | Cannot be measured due to severe cracking |

TABLE 3-continued

| Description | | Thermal Decomposition Condition | | | Normal Pressure Sintering Condition | | Porosity (%) |
|---|---|---|---|---|---|---|---|
| | | Temp. (° C.) | Time (h) | Heating speed (° C./min) | Temp. (° C.) | Time (h) | |
| | 2 | 1250 | 1 | 0.4 | 1700 | 2 | Cannot be measured due to severe cracking |
| | 3 | 1350 | 2 | 0.3 | 1770 | 1 | Cannot be measured due to severe cracking |
| Exemplary Embodiment | 1 | 1250 | 1 | 0.2 | 1750 | 2 | 0.7 |
| | 2 | 1300 | 1 | 0.4 | 1725 | 4 | 1.0 |
| | 3 | 1350 | 0.5 | 0.3 | 1775 | 1 | 0.3 |

As shown in Table 1, in case of Comparative Example 1, wherein sintering is performed at a temperature of 1725° C. in an argon atmosphere, 5.1 parts by weight of the silicon carbide precursor of the coating layer enveloping the three-layer-structured isotropic nuclear fuel particles is added. However, since this cannot sufficiently compensate for the shrinkage between the three-layer-structured isotropic nuclear fuel particles and the silicon carbide matrix phase, cracking has occurred through an entire test piece.

In case of Comparative Example 2, 92.9 parts by weight of the silicon carbide precursor of the coating layer enveloping the three-layer-structured isotropic nuclear fuel particles is added. Accordingly, due to the excessive amount of gas being discharged from the silicon carbide precursor during the sintering process, pores have been formed at the surroundings of the three-layer-structured isotropic nuclear fuel particles, and multiple cracks have occurred on the silicon carbide matrix phase of the ceramic capsulated nuclear fuel material.

Furthermore, in case of Comparative Example 3, 93.7 parts by weight of silicon carbide, which is used as the filler in the coating layer, is added, and the silicon carbide precursor is not added at all. Accordingly, during the sintering process, since the coating layer of the three-layer-structured isotropic nuclear fuel particles fails to endure the tensile stress caused by the shrinking of the silicon carbide, multiple cracks occur on the silicon carbide matrix phase of the ceramic capsulated nuclear fuel material for the same reason as FIG. 1.

Therefore, in the Comparative Examples 1~3, it was difficult to measure the porosity due to the multiple cracks occurring on the silicon carbide matrix phase. Thus, it is not preferable to use such preparation examples in the process of preparing ceramic capsulated nuclear fuel including multiple three-layer-structured isotropic nuclear fuels.

On the other hand, as shown in Exemplary Embodiments 1~3, a silicon carbide precursor corresponding to a range of 59.7~83.0 parts by weight is added to the coating layer of the ceramic nuclear fuel particles. And, accordingly, during the sintering process, since the shrinkage occurring in the coating layer of the three-layer-structured isotropic nuclear fuel particles becomes larger than the shrinkage of the silicon carbide matrix phase, the generation of tensile stress, which is caused by the shrinking of the matrix phase, as shown in FIG. 1, is controlled. Also, since silicon carbide particles corresponding to 10.9~30.0 parts by weight are added to the coating layer of the three-layer-structured isotropic nuclear fuel particles as the filler, the gas that is discharged when performing thermal decomposition on the silicon carbide precursor may be effectively released through an interface between the silicon carbide filler and the silicon carbide precursor. Thus, a fully ceramic capsulated nuclear fuel material is obtained.

Embodiment 4

1-1. Preparing a Ceramic Coating Layer Slurry Including a Silicon Carbide Precursor Polysiloxane and xylene resin are used as the silicon carbide precursor, wherein polysiloxane corresponds to 44.8 parts by weight and the xylene resin corresponds to 25.2 parts by weight. Also, 18.0 parts by weight of alpha-phase silicon carbide having an average particle diameter of 0.5 μm is also added, and 8.1 parts by weight of Alumina ($Al_2O_3$) having an average particle diameter of 0.5 μm, 2.7 parts by weight of Yttria ($Y_2O_3$) having an average particle diameter of 1 μm, and 1.2 parts by weight of Calcia (CaO) having an average particle diameter of 3 μm are added as the sintering additives, and 5 parts by weight of polysiloxane is additionally added as the organic additive, and 73 parts by weight of ethanol is additionally added as the solvent. And, a uniform mixture slurry is obtained by performing ball-milling for 24 hours by using a polyprophylene bottle and a silicon carbide ball.

1-2. Preparing Three-Layer-Structured Isotropic Nuclear Fuel Particles with a Ceramic Coating Layer Including a Silicon Carbide Precursor The three-layer-structured isotropic nuclear fuel particles are coated with the ceramic coating layer slurry including a silicon carbide precursor, which is prepared according to the above-described method of 1-1, by using the dip coating method. Then, a drying process is performed in a hot air oven for 24 hours at a temperature of 70° C., thereby preparing three-layer-structured isotropic nuclear fuel particles with a coating layer including silicon carbide precursor.

1-3. Preparing a Silicon Carbide Matrix Phase Composition 90 parts by weight of alpha-phase silicon carbide powder having an average particle diameter of 0.5 μm is added, and 7.0 parts by weight of Alumina ($Al_2O_3$) having an average particle diameter of 0.5 μm, 2.5 parts by weight of Yttria ($Y_2O_3$) having an average particle diameter of 1 μm, and 0.5 parts by weight of Calcia (CaO) having an average particle diameter of 3 μm are added as the sintering additives, and 2 parts by weight of polysiloxane is additionally added as the organic additive, and 72 parts by weight of ethanol is additionally added as the solvent. And, a uniform mixture slurry is obtained by performing ball-milling for 24 hours by using a polyprophylene bottle and a silicon carbide ball.

Thereafter, a uniform silicon carbide matrix phase mixture is prepared by drying the mixture in a general dryer.

1-4. Preparing a Ceramic Nuclear Fuel Shaped Body Including a Plurality of Ceramic-Coated Three-Layer-Structured Isotropic Nuclear Fuels The ceramic three-layer-structured isotropic nuclear fuel particles being coated with a ceramic layer including a silicon carbide precursor, which is prepared according to the above-described method of 1-2 is added to the silicon carbide matrix phase mixture, which is prepared according to the above-described method of 1-3, so that the content of the nuclear fuel particles becomes equal to 33% of the total volume of the composition, and, then, the mixture is processed with dry blending in a polyprophylene ball mill. The mixture is then poured into a rubber mold and processed with cold isostatic pressing (or molding) at a pressure of 70 MPa, thereby obtaining 20 cylindrical molded bodies each having a diameter of 12 mm and a height of 12 mm.

1-5. Performing Thermal Decomposition and Sintering of the Ceramic-Coated Ceramic Nuclear Fuel Shaped Body Including a Silicon Carbide Precursor The shaped body, which is prepared according to the above-described method of 1-4, is inserted in an alumina tube and then heated in ambient air starting from room temperature (or ambient temperature) to 200° C. at a heating speed of 0.2° C./min and, then, heated at a heating speed of 0.5° C./min starting from 200° C. to 1400° C. and, then, processed with thermal decomposition in an argon atmosphere for 1 hour at 1400° C.

The pre-sintered body processed with thermal decomposition at 1400° C. is inserted in a graphite moderated reactor and, then, processed with normal pressure sintering in an argon atmosphere for 2 hours at a temperature of 1775° C.

A ceramic capsulated nuclear fuel material including a plurality of three-layer-structured isotropic nuclear fuel particles with a coating layer having a higher shrinkage than a matrix phase is prepared by using the above-described process. And, no cracking was detected in the 20 ceramic-capsulated nuclear fuel materials, which are prepared as described above, and an accident-tolerant fully ceramic capsulated nuclear fuel having a porosity of the matrix phase corresponding 0.4±0.2% in average is prepared.

As described above, preferred embodiments of the present invention are described as exemplary embodiments of the present invention. However, it will be understood that the scope and spirit of the present invention will not be interpreted with limitation according to the exemplary embodiments presented herein, and that the scope and spirit of the present invention should be interpreted in accordance with the appended claims of this specification.

What is claimed is:

1. A fully ceramic capsulated nuclear fuel material including three-layer-structured isotropic nuclear fuel particles with a coating layer having, comprising:
   three-layer-structured isotropic nuclear fuel particles;
   a coating layer cladding the three-layer-structured isotropic nuclear fuel particles, wherein the coating layer corresponds to a layer being formed by sintering a silicon carbide precursor, first silicon carbide, and a sintering additive; and
   a silicon carbide matrix phase enveloping the coating layer cladding the three-layer-structured isotropic nuclear fuel particles,
   wherein, when a shrinkage of the coating layer of the three-layer-structured isotropic nuclear fuel particles during a sintering process is given as $\Delta L_C$, and when a shrinkage of the silicon carbide matrix phase during the sintering process is given as $\Delta L_m$, a condition of $\Delta L_C > \Delta L_m$, is satisfied when performing pressureless sintering,
   wherein the silicon carbide precursor is shifted to second silicon carbide in order to densify the coating layer during the sintering process such that the shrinkage of the coating layer is greater than the shrinkage of the silicon carbide matrix phase.

2. The nuclear fuel material of claim 1, wherein the sintering is performed by a pressureless sintering process, wherein the coating layer has a remaining porosity of more than 0% and less than or equal to 4% after performing the pressureless sintering process, and wherein an amount of the three-layer-structured isotropic nuclear fuel particles without the coating layer is in the range of 5-40 volume %.

* * * * *